United States Patent [19]

Hernden et al.

[11] Patent Number: 5,363,002

[45] Date of Patent: Nov. 8, 1994

[54] DYNAMOELECTRIC MACHINE HAVING FLUID COOLING OF BACK IRON AND END TURNS

[75] Inventors: Michael Hernden; Loren Rademacher, both of Rockford, Ill.

[73] Assignee: Sundstrand Corporation, Rockford, Ill.

[21] Appl. No.: 98,657

[22] Filed: Jul. 28, 1993

[51] Int. Cl.⁵ .................. H02K 1/20; H02K 9/00; H02K 9/16
[52] U.S. Cl. ..................... 310/54; 310/58; 310/216
[58] Field of Search .................. 310/54, 58, 59, 64, 310/216

[56] References Cited

U.S. PATENT DOCUMENTS

| | | | |
|---|---|---|---|
| 1,761,587 | 6/1930 | Ringland | 310/64 |
| 2,285,960 | 8/1940 | Fechheimer | 171/252 |
| 3,388,559 | 6/1968 | Johnson | 310/54 |
| 3,456,140 | 7/1969 | Collins et al. | 310/54 |
| 3,531,668 | 2/1969 | Cathey | 310/58 |
| 3,648,085 | 3/1972 | Fujii | 310/54 |
| 3,813,763 | 6/1974 | Church | 310/217 |
| 4,085,347 | 4/1978 | Lichius | 310/217 |
| 4,103,195 | 7/1978 | Torossian et al. | 310/217 |
| 4,445,056 | 4/1984 | Gaylord | 310/54 |
| 4,598,223 | 7/1986 | Glennon et al. | 310/59 |
| 4,644,210 | 2/1987 | Meisner et al. | 310/211 |
| 4,651,782 | 3/1987 | Rossie | 310/217 |
| 4,864,176 | 9/1989 | Miller et al. | 310/194 |

FOREIGN PATENT DOCUMENTS

| | | | |
|---|---|---|---|
| 2323817 | 12/1993 | Germany. | |
| 0056446 | 4/1980 | Japan | 310/58 |
| 0156138 | 9/1984 | Japan | 310/59 |
| 0076043 | 4/1986 | Japan | 310/58 |
| 0055550 | 2/1990 | Japan | 310/54 |

*Primary Examiner*—Steven L. Stephan
*Assistant Examiner*—Clayton E. LaBalle
*Attorney, Agent, or Firm*—Jeffery J. Makeever

[57] ABSTRACT

A dynamoelectric machine such as a generator has stator winding end turns which extend beyond the ends of a stator core of the apparatus. The end turns are cooled by conveying fluid coolant from back iron cooling grooves to fluid coolant exit ports through which the coolant is distributed onto the end turns. The cooling arrangement eliminates the need for separate spray rings or nozzles and is low in cost and easy to clean.

2 Claims, 2 Drawing Sheets

DYNAMOELECTRIC MACHINE HAVING FLUID COOLING OF BACK IRON AND END TURNS

FIELD OF THE INVENTION

The present invention relates to a dynamoelectric machine and, more particularly, to a cooling arrangement and method for cooling back iron and stator winding end turns of a laminated stator core of the dynamoelectric machine.

BACKGROUND ART

It is known to cool the outer periphery or "back iron" of a stator in a dynamoelectric machine such as a generator by providing cooling grooves in a housing which surrounds the stator core. A coolant, typically oil, is conveyed through the cooling grooves in contact with the outer periphery of the stator core for cooling the stator core. Where the stator windings have end turns which extend beyond the axial ends of the laminated stator core, special provisions have also been made for cooling these end turns. For example, U.S. Pat. No. 3,531,668 discloses an induction motor cooling arrangement wherein special retaining members are located adjacent the stator core ends which are formed with cooling fluid orifices. U.S. Pat. No. 3,648,085 is directed to a liquid cooling arrangement for dynamoelectric machine wherein special annular distributing manifolds or spray rings having atomizing spray nozzles are located on opposite sides of the stator core for cooling the end turns. These known cooling arrangements are disadvantageous in that they are relatively expensive to manufacture and also to clean or maintain. The additional cooling structures required in these known cooling arrangements also can create friction and windage losses to reduce the operating efficiency of the dynamoelectric machine.

U.S. Pat. No. 2,285,960 discloses a dynamo-electric machine wherein axial ducts are drilled through the numerous laminations of the stator core for conveying coolant axially for cooling stator winding end turns. One problem associated with this type of cooling arrangement is that it requires drilling the entire stator core which is relatively expensive. Moreover, this known cooling arrangement is relatively difficult to clean and maintain. See also U.S. Pat. No. 4,864,176.

SUMMARY OF THE INVENTION

Thus, an object of the present invention is to provide an improved dynamoelectric machine and, more specifically, an improved cooling arrangement and method for cooling stator winding end turns in the dynamoelectric machine which avoid the aforementioned disadvantages and problems associated with the prior art.

A further object of the invention is to provide an improved dynamoelectric machine and a cooling arrangement and method for cooling stator winding end turns in a manner which does not create substantial friction and windage losses which would reduce the operating efficiency of the electrical apparatus. A further object of the invention is to provide an improved dynamoelectric machine and a cooling arrangement and method for cooling stator winding end turns of the electrical apparatus wherein the cooling arrangement is relatively low cost and easy to manufacture as well as being easy to clean and maintain.

These and other objects are attained by the present invention wherein coolant from the back iron cooling grooves or channels for cooling the outer periphery of the stator core is distributed to the stator winding end turns by way of fluid exit ports located adjacent the end turns, thereby obviating the need for additional spray rings or manifolds with atomizing nozzles and facilitating cleaning and maintenance without introducing friction and windage losses. More specifically, according to the cooling arrangement and method of cooling stator winding end turns of the invention, first fluid passages are provided for conveying a fluid coolant along the outer periphery of the stator core. Second fluid passages are provided which communicate with the first fluid passages, channeling the fluid to a location adjacent the stator winding end turns. The second fluid passages are open on a side thereof adjacent the stator winding end turns for discharging fluid coolant from the second passage means onto the adjacent end turns.

The dynamoelectric machine of the invention is one comprising a rotor which is rotatable about an axis and a stator located radially outward from the rotor. The stator includes a laminated stator core and stator windings having end turns which extend beyond at least one axial end of the laminated stator core. Fluid passages are provided in the electrical apparatus for conveying a fluid coolant for cooling at least the radially outer portion of the laminated stator core. The fluid passages include at least one fluid coolant passage. Fluid transfer channels for distributing the fluid coolant from the at least one fluid coolant passage to at least one fluid coolant exit port located adjacent the end turns are provided for distributing the cooling fluid onto the end turns for cooling the end turns.

These and objects, features and advantages of the present invention will become more apparent from the following description of one preferred embodiment of the invention as illustrated in the accompanying drawings.

DESCRIPTION OF THE PREFERRED EMBODIMENTS

Figure 1:
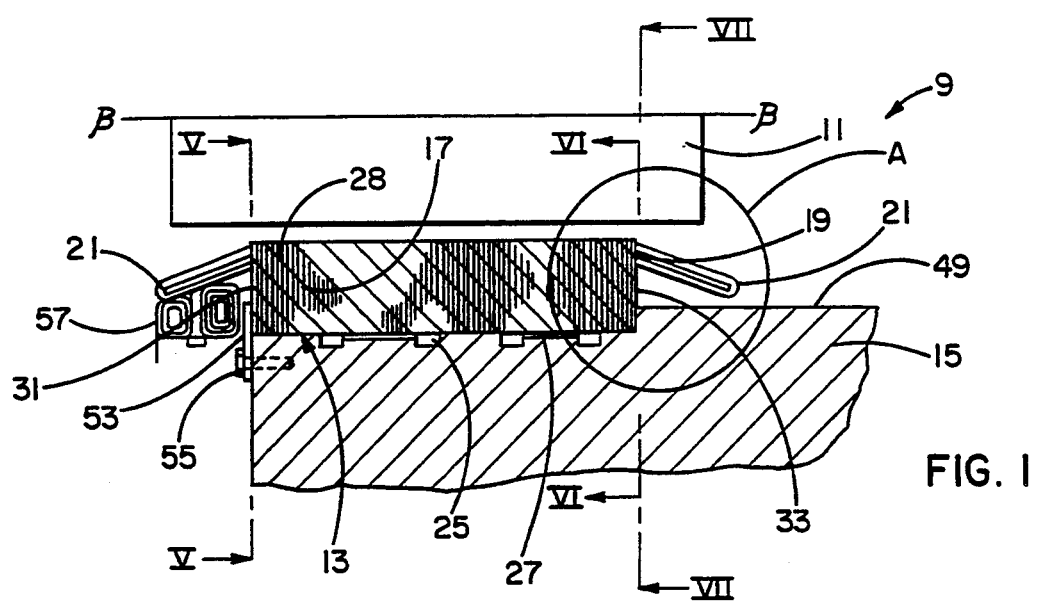
FIG. 1 is a partial cross-sectional view taken along the axis of rotation B-B of an electric generator of the invention wherein portions of generator rotor, stator with stator winding end turns and housing are illustrated.
Figure 2:
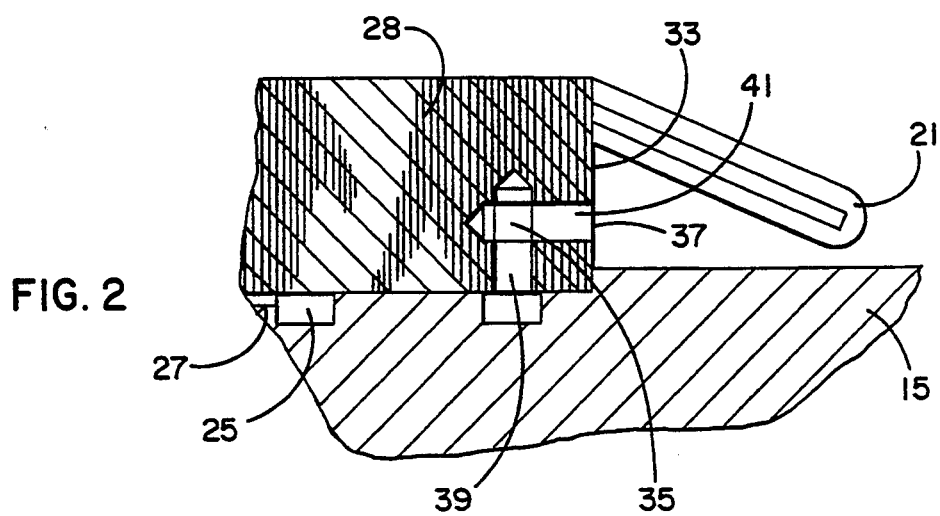
FIG. 2 is an enlarged portion of the electric generator of FIG. 1 within the circle A illustrating one embodiment of the cooling arrangement of the invention for cooling the stator winding end turns.

Referring now to the drawings, a dynamoelectric machine 9 according to the invention is an electric generator. The generator comprises a rotor 11 which is rotatable about the axis B—B as shown in FIG. 1. A stator 13 is located radially outward from the rotor 11 and secured within a housing 15 of the apparatus. The housing 15 is preferably formed of a metal, for example of aluminum or magnesium alloy. The generator components shown in FIG. 1 are generally symmetric about the axis B—B but only that portion to the lower side of the axis B—B as illustrated in FIG. 1, are depicted. The stator 13 includes a laminated stator core 28 formed of a plurality of slacked laminates of a magnetic material, e.g. steel laminations 17, and stator windings 19 with end turns 21 which extend beyond both axial ends of the stator core 28 as depicted in FIGS. 1, 2, 3 and 4. The stator windings 19 extend through openings 23 (FIG. 5) in the laminations 17 of the stator core 28.

The cooling fluid channels or grooves 25 in the radially inner surface of the housing 15 adjacent the outer periphery of the stator core 28 extend about the circumference of the stator core 28 for cooling the radially outer portion or back iron of the stator core 28. The configuration of the fluid channels 25 in the housing 15 for cooling the stator can be like that shown in U.S. Pat. No. 4,578,962, for example.

Figure 3:
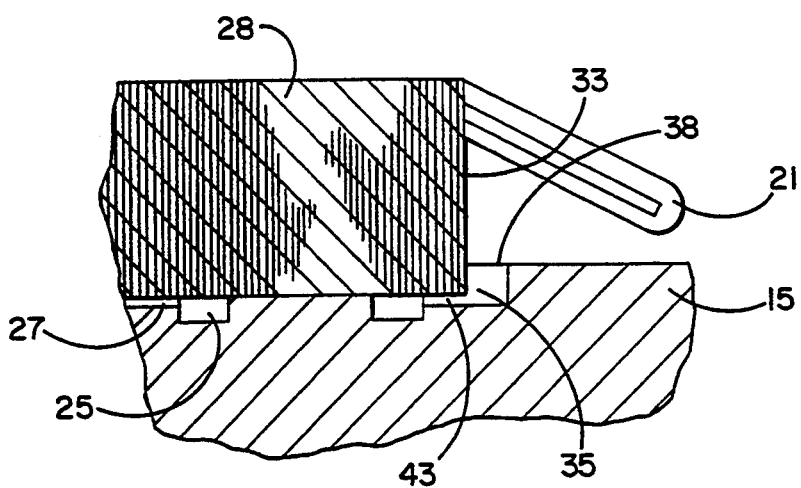
FIG. 3 is an enlarged portion of the electric generator of FIG. 1 within the circle A illustrating an alternate embodiment of the cooling arrangement of the invention for cooling the stator winding end turns.

According to the invention, the dynamoelectric machine 9 further comprises axially extending fluid coolant passages 27 which communicate with the channels 25 for conveying fluid coolant to fluid coolant exit ports 37 (FIGS. 2-4) located adjacent the stator winding end turns 21 via transfer channels 35 which are integrally formed within the stator core 28 (see FIG. 2 and FIG. 4), or alternatively within the housing 15 (see FIG. 3). The coolant passages 27 are formed by grooves 29 formed in the outer periphery of the laminations 17 of the stator core 28 located adjacent the housing 15 between the end laminations 31 and 33, see FIG. 5.

In the preferred embodiment the fluid coolant from the axially extending fluid coolant passages 27 flows through a plurality of circumferentially spaced, linear radial transfer bores 39 which communicate radially inwardly from the outer periphery of the stator core 28 with a like number of axial transfer bores 41 extending from the point of communication internal of the stator core 28 to the end laminations 31, 33 allowing the fluid coolant to reach the fluid coolant exit ports 37 defined thereby. A plurality of these two perpendicularly communicating bores 39, 41 form the transfer channels 35 allowing fluid coolant to be channeled to the exit ports 37 so that fluid coolant can be sprayed in the direction of the end turns 21 to cool the end turns 21.

In an alternate embodiment illustrated in FIG. 3, the fluid coolant from the axially extending fluid coolant passages 27 flows through a plurality of circumferentially spaced axial fluid transfer passages 43 being formed between the radially outer periphery of the stator core 28 and the housing 15 and extending beyond the axial end of the stator core 28 thus defining radially directed fluid coolant exit ports 37 allowing fluid coolant to be sprayed in the direction of the end turns 21 to cool the end turns 21.

Figure 7:
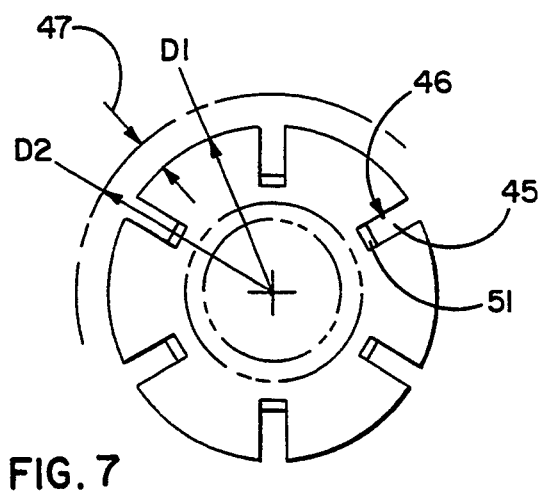
FIG. 7 is a cross-sectional view through the generator of FIG. 1 taken along the line VII—VII and depicting an end lamination of the stator core with coolant slots formed therein.

In a third embodiment fluid coolant from the axially extending fluid coolant passages 27 flows along annular passages 47, formed as a result of the end laminations 31, 33 having a diameter $D_1$ which is smaller than the diameter $D_2$ of the laminations 17 intermediate the end laminations 31, 33, to a plurality of circumferentially spaced slots 45 formed in the end laminations so as to extend radially inwardly from the outer periphery of the end laminations as shown in FIG. 7. These slots 45 in the end laminations 31, 33 together with the adjacent housing 15 and the stator core laminations 17 adjacent the end laminations define radially inwardly extending fluid coolant passages 46 for conveying the fluid coolant to a location adjacent the stator winding end turns 21. Radially inwardly of the inner surface 49 of housing 15 the slots 45 are open on the side of each end lamination adjacent end turns 21 so that the coolant oil can be sprayed from the slots in the direction of the end turns, shown by the arrows 50 in FIG. 4, to cool the end turns. To facilitate this spraying, the radially inner ends of the slots 45 are defined by surfaces 51 which are angled in the direction of the end turns for deflecting the fluid coolant toward the end turns.

The end laminations 31 and 33 in the disclosed embodiment are formed of an insulating material, for example insulating material commercially sold and marketed as Nomex ®, with the end laminations being glued or epoxied to the stator core 28. Alternatively, the end laminations 31, 33 could also be formed of the same or another magnetic material as the intermediate laminations of the stator core. An annular collar 53 (FIG. 1) of the housing 15 is releasably fastened to one axial end of the housing by bolts 55 for clamping the radially outer portion of the stator core 28 in position in the housing 15. The collar 53 also forms part of the annular passage 47 adjacent end lamination 31 for retaining coolant in the passage in the third embodiment discussed above.

The dynamoelectric machine 9 shown in FIG. 1 also carries a generator differential current transformer 57 on end turns 21 at one end of the stator 13. The transformer 57 may be attached to the end turns using a glass tie or cord formed of another insulating material, such as that commercially sold and marketed as Nomex ® or other insulating cord which is epoxied in place after attachment. The outside diameter of the stator 13 is typically six inches in the illustrated embodiments, for the two-pole generator with the rotor 11 having an outside diameter of three inches. For a four-pole generator, the outside diameter of the stator is typically eight inches, for example. The laminations 17 of the laminated stator core 28 preferably each have a thickness within the range 0.006–0.020 inch. The laminations 17 in the preferred embodiment are 0.014 inch thick.

Figure 4:
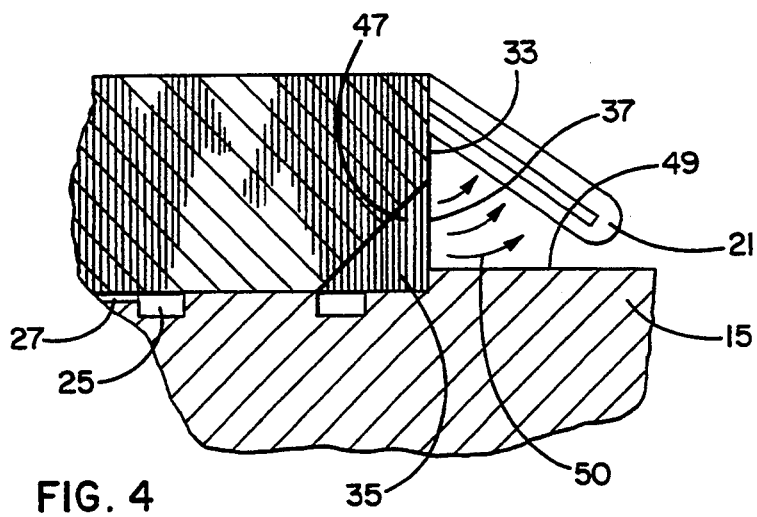
FIG. 4 is an enlarged portion of the electric generator of FIG. 1 within the circle A illustrating a further alternate embodiment of the cooling arrangement of the invention for cooling the stator winding end turns.
Figure 5:
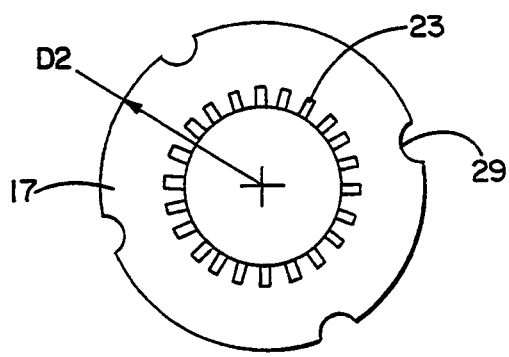
FIG. 5 is a cross-sectional view through the generator of FIG. 1 taken along the line V—V showing a stator core lamination located next to an end lamination of the core.
Figure 6:
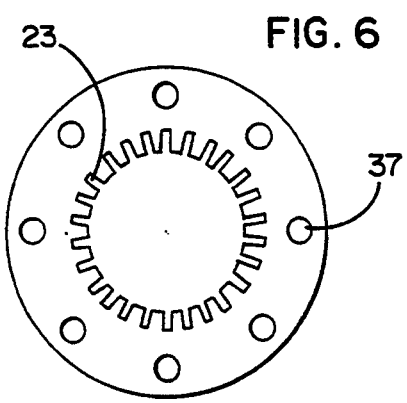
FIG. 6 is a cross-sectional view through the generator of FIG. 1 taken along the line VI—VI and depicting an end lamination of the stator core with axial fluid coolant bores formed therein.

The radial and axial transfer bores 39 and 41 in the preferred embodiment may be drilled into the assembled stator core 28 or may be formed by punching the laminations during manufacture prior to assembly. The axial fluid passages are machined into the housing 15 during the manufacture process at the same time as the fluid channels 25. The width of the slots 45 in the end lamination 31 and 33 for the third embodiment is preferably 0.020–0.030 inch with the radially inner edge of the slots being angled in the direction of the adjacent stator winding end turns as seen in the drawings of FIGS. 4 and 7. The slots are open, through slots extending from one side of the end laminations to the other. As a result of this construction, the slots 45 and also the grooves 29 in the other periphery of the end lamination 31 and 33 can be formed during manufacturing by punching.

While we have shown and described only three embodiments in accordance with the present invention, it is understood that the present invention is not limited thereto but is susceptible to variations as will be understood by the skilled artisan. For example, the dynamoelectric machine of the invention can be used in other types of apparatus than a generator, such as in an induction motor or other electrical apparatus wherein stator winding end turns must be cooled.

Therefore, we do not wish to be limited to the details shown and described therein, but intend to cover all such changes and modifications as are encompassed by the scope of the appended claims.

We claim:

1. A dynamoelectric machine, comprising:
   a rotor which is rotatable about an axis;
   a stator radially spaced from the rotor about the axis, said stator including a laminated stator core and stator windings having end turns which extend beyond at least one axial end of said laminated stator core;
   a housing about said stator core;
   fluid passage means for conveying a fluid coolant for cooling at least a radially outer portion of said laminated stator core, said fluid passage means including at least one fluid coolant passage, said at least one fluid coolant passage being formed between a radially outer periphery of said stator core and said housing;
   fluid transfer means for distributing the fluid coolant from said at least one fluid coolant passage to at least one fluid coolant exit port located adjacent said stator winding end turns and onto said end turns for cooling said end turns; and wherein
   said at least one fluid coolant passage is formed in part by at least one groove formed in an outer periphery of said laminated stator core;
   said fluid transfer means includes at least one radially inwardly extending slot in said at least one end lamination in fluid communication with said at least one fluid coolant massage for conveying fluid coolant radially inward in said at least one end lamination from said at least one fluid coolant passage to a location adjacent said stator winding end turns; and
   a radially inner end of said at least one slot is defined by a surface which is angled toward an open side of said at least one slot and the adjacent stator winding end turns.

2. A method of cooling stator winding end turns of a stator having a laminated stator core and stator windings with end turns which extend beyond at least one end of the stator core, comprising:
   (a) conveying a fluid coolant along an outer periphery of said stator core to at least one end lamination of said stator core located adjacent stator winding end turns;
   (b) flowing the fluid coolant radially inwardly through radially inwardly extending fluid passage means having a radially inner end defining a surface which is angled toward the adjacent stator winding end turns formed in the at least one end lamination to a location adjacent stator winding end turns; and
   (c) discharging fluid coolant from a radially inner portion of the fluid passage means in said at least one end lamination onto said end turns for cooling said end turns.

* * * * *